(12) United States Patent
Wai

(10) Patent No.: US 6,248,974 B1
(45) Date of Patent: Jun. 19, 2001

(54) METHOD AND APPARATUS FOR LASER TREATMENT OF A GOLF BALL

(75) Inventor: Martin P. Wai, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/527,549

(22) Filed: Mar. 16, 2000

(51) Int. Cl.[7] ............................................. B23K 26/38
(52) U.S. Cl. ................... 219/121.69; 219/121.68; 219/121.72
(58) Field of Search .................. 219/121.68, 121.69, 219/121.71, 121.72, 121.67

(56) References Cited

U.S. PATENT DOCUMENTS

| | | |
|---|---|---|
| 3,561,908 | 2/1971 | Reinfeld . |
| 3,823,301 | 7/1974 | Swarat . |
| 4,501,715 | 2/1985 | Barfield et al. . |
| 4,539,463 | 9/1985 | Piccioli et al. . |
| 4,779,387 | 10/1988 | Reid et al. . |
| 4,894,958 | 1/1990 | Takasaki . |
| 5,099,101 | 3/1992 | Millerick et al. . |
| 5,190,294 | 3/1993 | Oka . |
| 5,248,878 * | 9/1993 | Ihara ............................. 219/121.69 |
| 5,359,173 | 10/1994 | Opdyke . |
| 5,360,314 | 11/1994 | Provost et al. . |
| 5,425,903 | 6/1995 | Sloane, Jr. et al. . |
| 5,431,865 | 7/1995 | Quin . |
| 5,465,780 | 11/1995 | Muntner et al. . |
| 5,494,631 | 2/1996 | Oka et al. . |
| 5,554,337 | 9/1996 | Ihara . |
| 5,925,270 * | 7/1999 | Minhas .......................... 219/121.69 |
| 5,966,213 * | 10/1999 | Shimosaka et al. . |

* cited by examiner

Primary Examiner—Geoffrey S. Evans
(74) Attorney, Agent, or Firm—Michael A. Catania

(57) ABSTRACT

A laser is positioned relative to a rotating golf ball to remove any excess material, and if necessary to impart an aerodynamic pattern on particular areas of the golf ball, including the parting line. A preferred laser is a carbon dioxide laser. The laser beam may be de-focused to form a dimple on the parting line of the golf ball.

20 Claims, 8 Drawing Sheets

METHOD AND APPARATUS FOR LASER TREATMENT OF A GOLF BALL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the manufacturing of a golf ball. More specifically, the present invention relates to a method and apparatus for manufacturing a golf ball that involves the use of a laser to primarily remove excess seam material from the golf ball.

2. Description of the Related Art

Golf balls generally have either a one-piece construction or they may comprise several layers including a core, one or more intermediate layers and an outer cover that surrounds any intermediate layer and the core. Golf balls are typically manufactured by various molding processes, whether one-component or multi-component balls. Generally, the core of the golf ball is formed by compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, or injection molding.

In an injection molding process, golf balls are typically created by the injection molding of a fluid stock material around a pre-formed core. In the case of a two-component golf ball, the fluid stock material is the cover material used for the golf ball. Injection molding devices generally have two separate and mating hemispheric halves that form a cavity in which the golf ball is created. Fluid stock material is generally fed to the cavity within the mold through one or more conduits, or "runners" as they are commonly referred to in the art. The fluid stock material travelling through the runners enters the actual cavity of the mold via one or more gates. These gates are typically positioned at the parting line created between the interface of the two mold halves. Locating the gates at the parting line, however, results in unwanted material being left on the newly formed golf ball at the parting line. For example, flashing can occur along the equatorial region of the golf ball. In addition, when the gates are located at the parting line of the mold, vestigial stock material located inside the gates of the molding device is attached to the surface of the ball after the mold halves are pulled apart. Additional finishing processes are then required to remove the flashing and any excess material, which can interfere with the dimple pattern on the surface of the golf ball, thereby affecting the performance characteristics of the golf ball.

Similar problems arise with casting a thermosetting polymer cover on a core or multi-layer golf ball precursor product. Typical thermosetting polymer materials include polyurethanes, polyureas, polyether block amides, and the like. A thermosetting cover typically has a flash ring that is tough, and resistant to removal by conventional techniques. The use of thermosetting covers often require that the flash ring be cut prior to sanding or buffing. Additionally, the removal of the flash ring may have a deleterious result on dimples adjacent the parting line depending on the width of the parting line, and the precision of the sanding or buffing device.

One example of a buffing process is Reid et al., U.S. Pat. No. 4,779,387, originally filed in 1986, for a Method And Apparatus For Automatically Buffing A Golf Ball. The Reid patent discloses cutting and sanding to remove a flash ring. The sanding belt (152) of the Reid patent partially deflects about the golf ball during removal of the flash ring.

Another example is Takasaki, U.S. Pat. No. 4,894,958, originally filed in Japan in 1987, for an Apparatus For Scraping Off Burrs At Resin Outer Layer Of A Golf Ball. The Takasaki patent discloses a device that rotates a golf ball while a bite assembly removes the flash ring.

Yet another is Oka et al., U.S. Pat. No. 5,494,631, which was originally filed in Japan in 1992 for an Apparatus And Method For Manufacturing Golf Ball. The Oka patent discloses an apparatus for removing the flash ring from a golf ball that has dimples on the parting line. The Oka patent discloses using a rotating cutting member with a semi-hemispherical surface that is smaller in diameter than a dimple to remove the flash ring inside of a dimple.

Another example is Ihara, U.S. Pat. No. 5,554,337, which was originally filed in Japan in 1994, for Preparation Of Spherical Body. The Ihara patent discloses using an ultrasonic cutter to remove a thermoplastic flash ring from a golf ball. The Ihara patent also discloses that using a laser beam to remove a fin results in scorching of the surface of the golf ball due to laser heat.

The use of lasers to assist in trimming excess material from an object is also disclosed in Millerick et al, U.S. Pat. No. 5,099,101, and Picciolo et al., U.S. Pat. No. 4,539,463. The Millerick patent is for trimming excess material from semiconductor packaging, and the Picciolo patent is for trimming excess material from polyester containers.

A post-mold formation of dimples on a golf ball is disclosed in Oka, U.S. Pat. No. 5,190,294, which was originally filed in Japan in 1990 for a Golf Ball. The Oka patent discloses removing a flash ring, then using a heated trowel to create dimples on the seam line.

Consequently, there remains a need for a more efficient removal of the flash ring on a post-molded golf ball, especially one having a dimples on the parting line.

BRIEF SUMMARY OF THE INVENTION

The present invention provides a novel method and apparatus for removing the flash ring of a recently molded golf ball. The present invention accomplishes this through the use of a laser that is positioned in relation to a golf ball that is rotated on a holder thereby allowing for the efficient removal of a flash ring.

One aspect of the present invention is a method for removing excess material from a golf ball. The method includes rotating a golf ball having excess material extending from a surface of the golf ball. The golf ball is rotated about an imaginary axis through each of the poles of the golf ball. Next, a laser beam is focused at the excess material substantially perpendicular to the imaginary axis. Next, the excess material is burned from the golf ball through heat from the laser beam while the golf ball is rotated about the imaginary axis.

Another aspect of the present invention is an apparatus for removing excess material from a golf ball. The apparatus includes a rotating means and a laser mechanism. The rotating means rotates a golf ball about an imaginary axis at a rotation of at least 5000 rotations per minute. The laser mechanism is disposed in proximity to the rotating means. The laser mechanism has a laser with a frequency of at least 500 hertz, and a nozzle for directing the laser at a golf ball disposed on the rotating means.

Yet another aspect of the present invention is a method for imparting a dimple pattern on a smooth surface of a golf ball. The method includes rotating the golf ball about an imaginary axis of the golf ball. Next, a laser beam is de-focused at the smooth surface. The laser beam has a frequency of at least 500 hertz and a pulse width of at least fifty microseconds. Next, a dimple pattern is burned on the smooth surface of the golf ball through heat from the de-focused laser beam while the golf ball is rotated about the imaginary axis.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
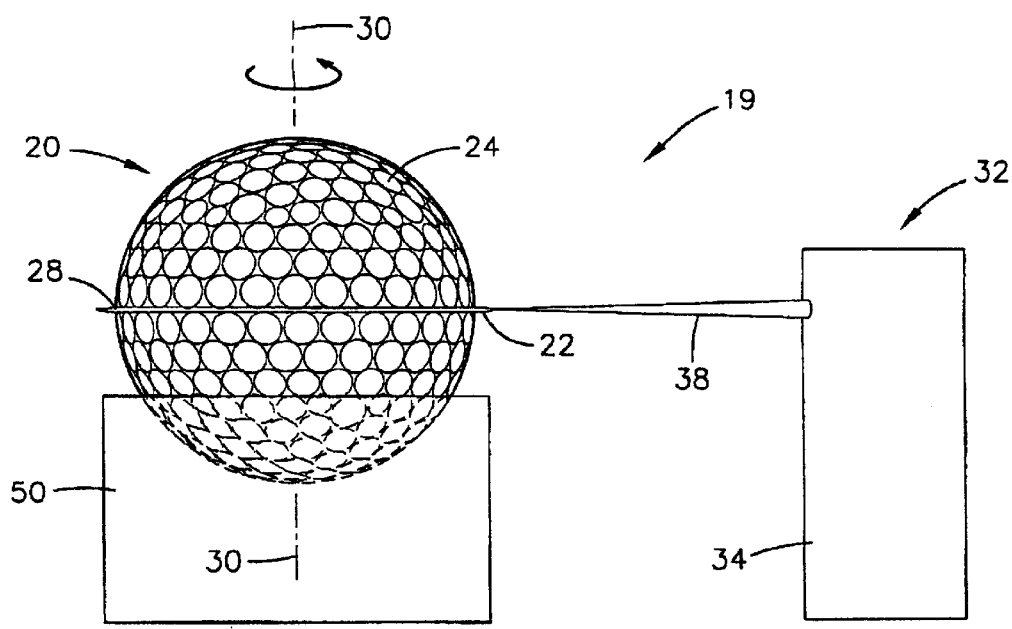
FIG. 1 is a schematic side view of the apparatus of the present invention with a golf ball positioned for laser removal of its flash ring.

As shown in FIGS. 1–7, an apparatus for laser removal of excess material from a recently molded golf ball is generally designated 19. A golf ball 20 has excess material 22, such as a flash ring, due to molding techniques that force excess material outward along the parting line of the mold halves that are used to form the cover of the golf ball 20. Cover molding techniques include casting, compression and injection molding techniques. The excess material 22 is retained on the golf ball 20 in the form of a flash ring, projections or the like.

The cover of the golf ball 20 will have a plurality of dimples 24 thereon that form the aerodynamic pattern of the golf ball 20. The golf ball 20 may be "mapped" as having a pair of poles 26 and an equator 28. The excess material 22 usually lies at the equator 28 since most parting lines are aligned with the equator 28 of the golf ball 20. An imaginary axis 30 is positioned through the poles 26 of the golf ball 20.

A laser mechanism 32 is positioned relative to the golf ball 20 to effect removal of the excess material 22 through use of a laser beam. The laser mechanism 32 has a housing 34 with a convergence lens 36 that directs a laser beam 38 toward the excess material 22. The laser mechanism is movable along x, y and z axes in relation to the golf ball 20. In one embodiment, the laser beam 38 has a focal point 40 and is considered focused for removal of excess material 22. In an alternative embodiment, the laser beam 38a converges in front of the golf ball 20 and is considered de-focused. The golf ball 20 is rotated in a rotating holder 50 during the removal process. In a preferred embodiment, the golf ball 20 is rotated about the imaginary axis 30 through the poles 26. The golf ball 20 will be seated so as to position the excess material 22 for removal by the laser beam 38. Thus, the excess material 22 should not lie within the rotating holder 50.

Figures 2, 2A:
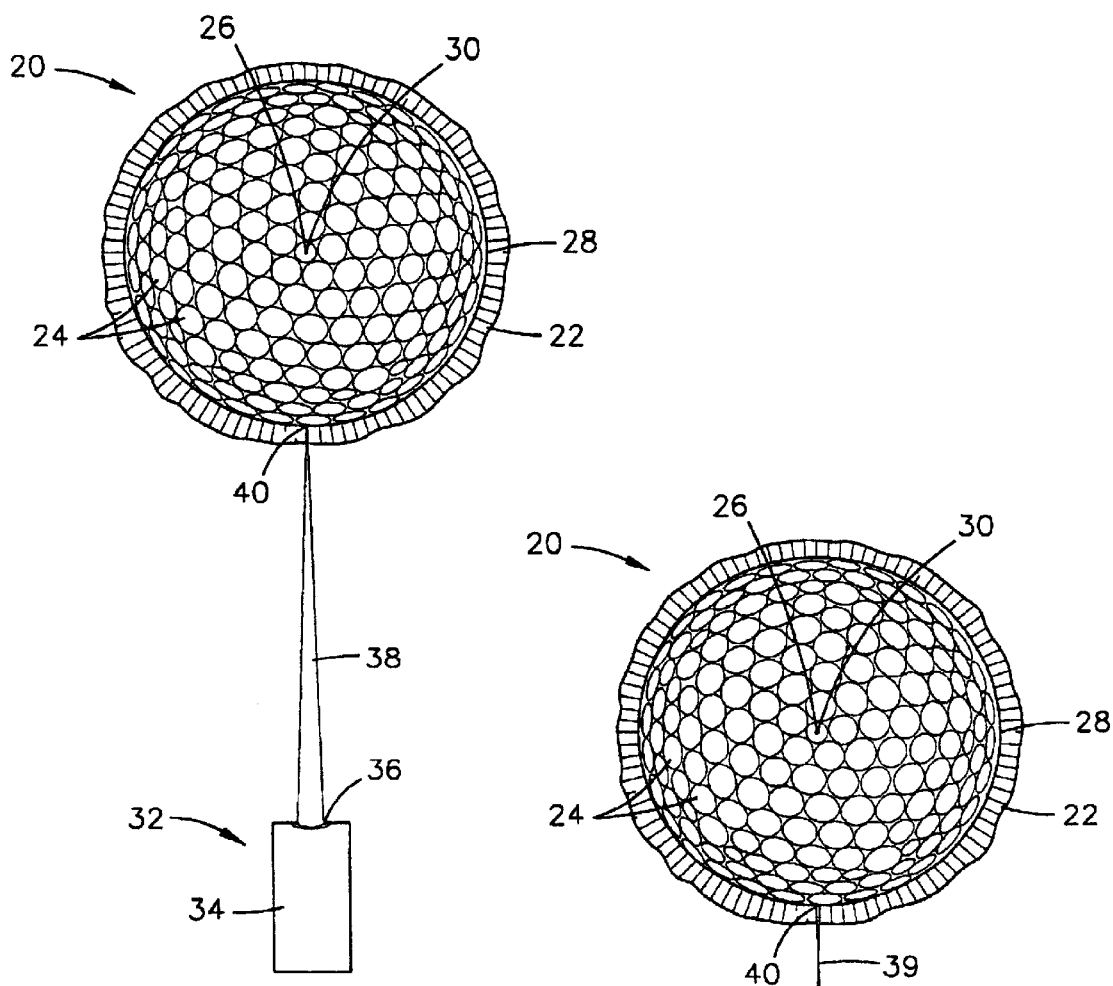
FIG. 2 is a top plan schematic view of FIG. 1.
FIG. 2A is a top plan schematic view of FIG. 1A.

A preferred embodiment as shown in FIGS. 1 and 2 has the laser beam 38 focused directly at the excess material 22 in a horizontal plane with the equator 28 of the golf ball 20. In this embodiment, the laser beam 38 burns away the excess material 22 as the golf ball 20 is rotated on the holder 50. The power of the laser beam 38 is controlled to prevent scorching or other deleterious effects to the surface of the golf ball 20. Thus, only the excess material 22 is burned away while the desired surface of the golf ball 20 is untouched by the laser beam 38.

Figure 1A:
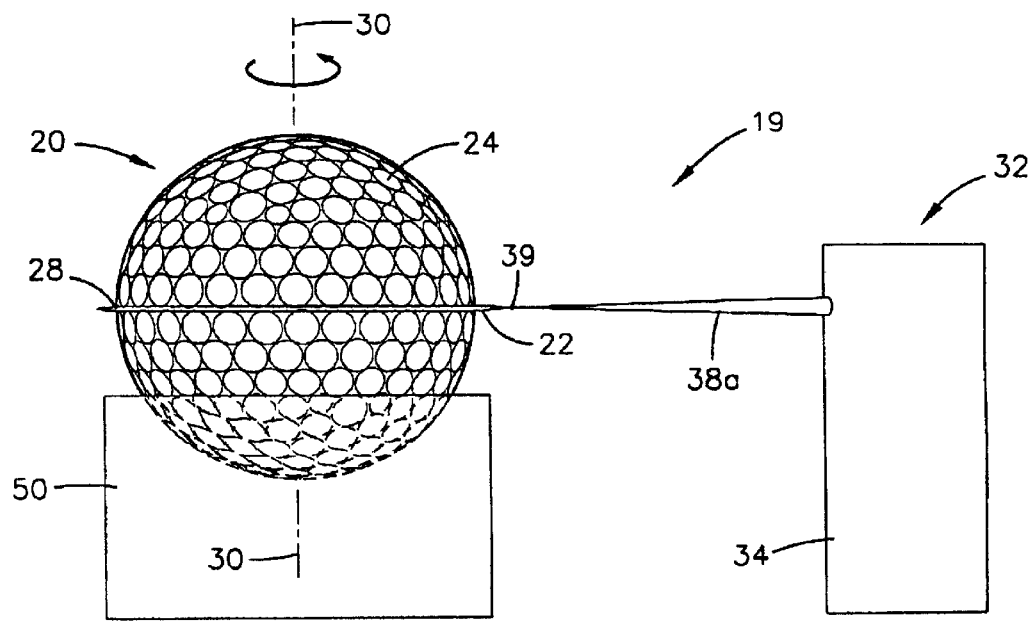
FIG. 1A is a schematic side view of the apparatus of the present invention with a golf ball positioned for de-focused laser removal of its flash ring.

An alternative embodiment shown in FIGS. 1A and 2A has the laser beam 38a defocused at the excess material 22 of the golf ball 20 to remove the excess material and form a plurality of dimples 24 on the parting line/equator 28 of the golf ball 20. The de-focused laser beam 38a has a convergence point 39 in front of the golf ball 20. The de-focused laser beam 38a has the highest energy at its center and lower energy outward from the center allowing for the forming of a dimple 24 with a greatest depth at its center. The de-focused laser is explained in greater detail below.

A preferred laser is a carbon dioxide laser such as available from Convergent Energy of Sturbridge, Mass. The laser has a frequency of between 400 and 2000 Hertz, more preferably between 500 and 1500 Hertz, and most preferably 1000 Hertz. The pulse width of the laser is between 30 and 100 microseconds, more preferably 50 and 75 microseconds, and most preferably 70 microseconds. The laser mechanism 32 has a nozzle 33, not shown, that has a diameter of 0.6 inches for focusing the laser beam 38. The laser mechanism 32 also has a source of gas to assist the laser beam 38 in removing the excess material 22. The gas is preferably air or nitrogen, however, those skilled in the pertinent art will recognize that other similar gases may be utilized without departing from the scope and spirit of the present invention. The gas is preferably released at a pressure of twenty pounds per square inch.

Figure 3:
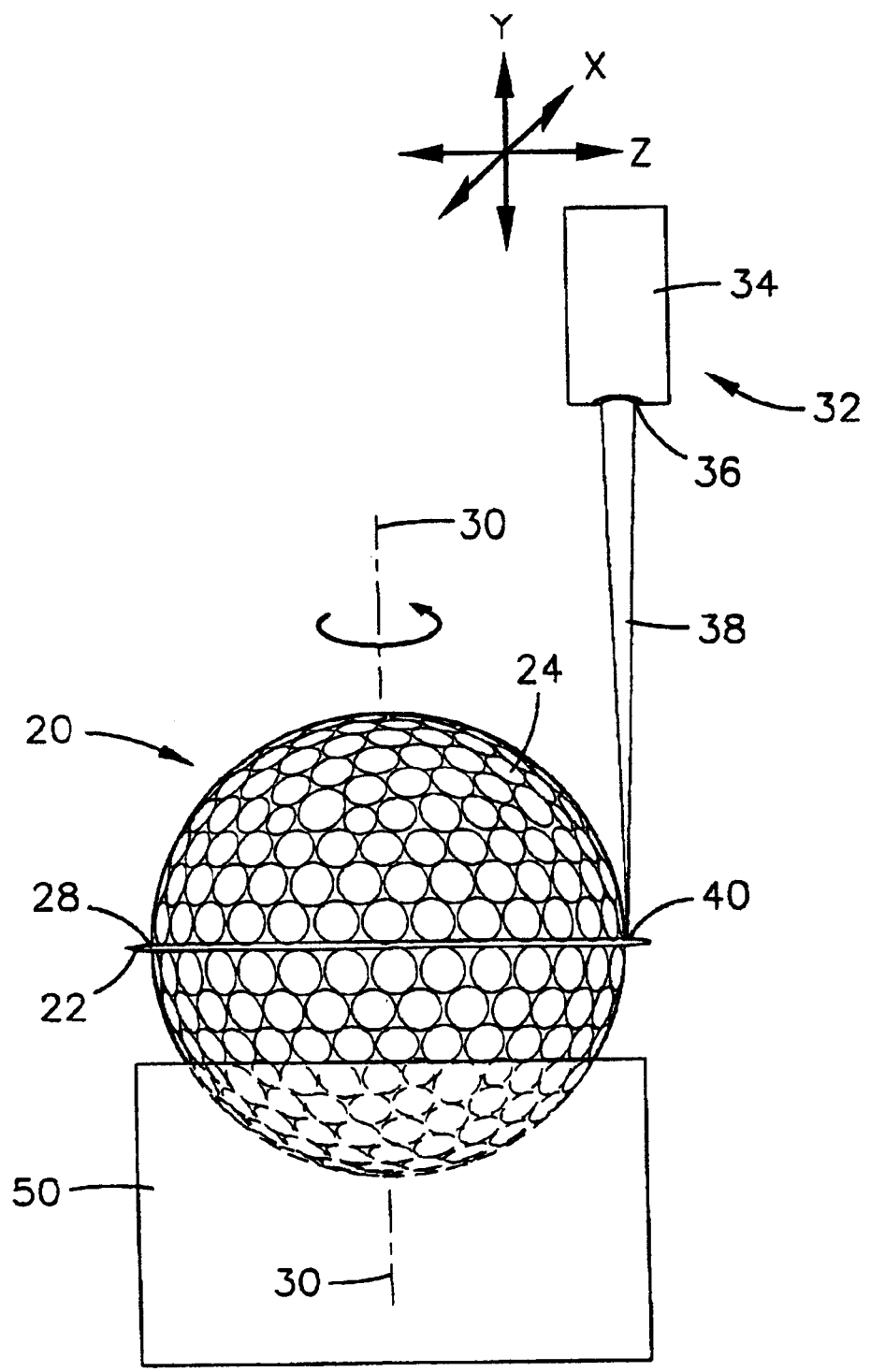
FIG. 3 is a schematic side view of an alternative embodiment of the present invention with the laser direct downward toward the flash ring.
Figure 4:
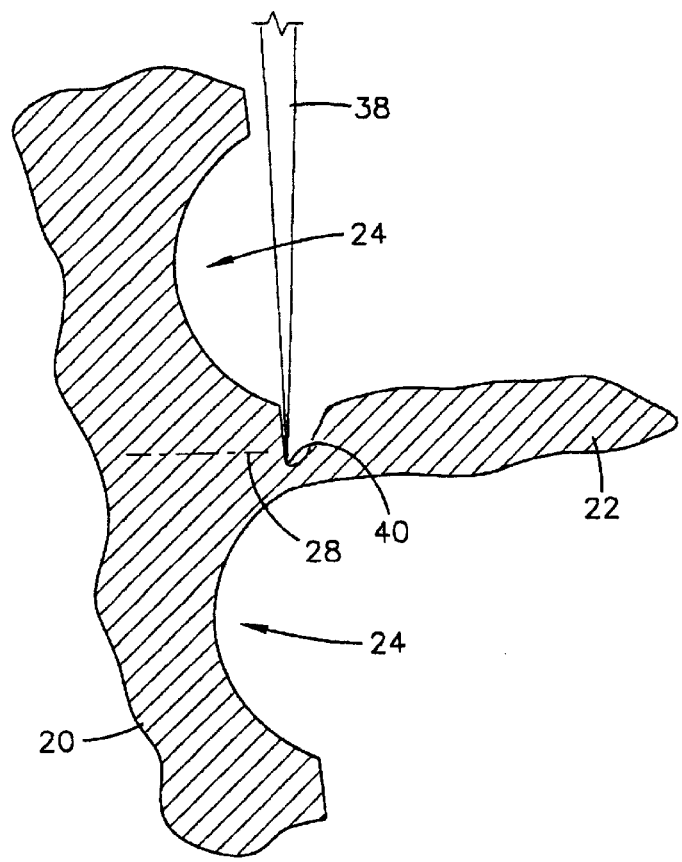
FIG. 4 is an enlarged isolated view of FIG. 3 of the laser removing the flash ring from the golf ball.

FIGS. 3 and 4 illustrate an alternative embodiment of the present invention wherein the laser mechanism 32 is mounted above the golf ball 20 for trimming of the excess material 22 therefrom. In this embodiment, the laser beam 38 trims the excess material 22 as the golf ball 20 is rotated at a predetermined rate. The focal point 40 is positioned at the edge of the desired surface of the equator 28 or parting line of the golf ball 20 to burn the excess material 22 adjacent the surface of the golf ball 20.

Figure 5:
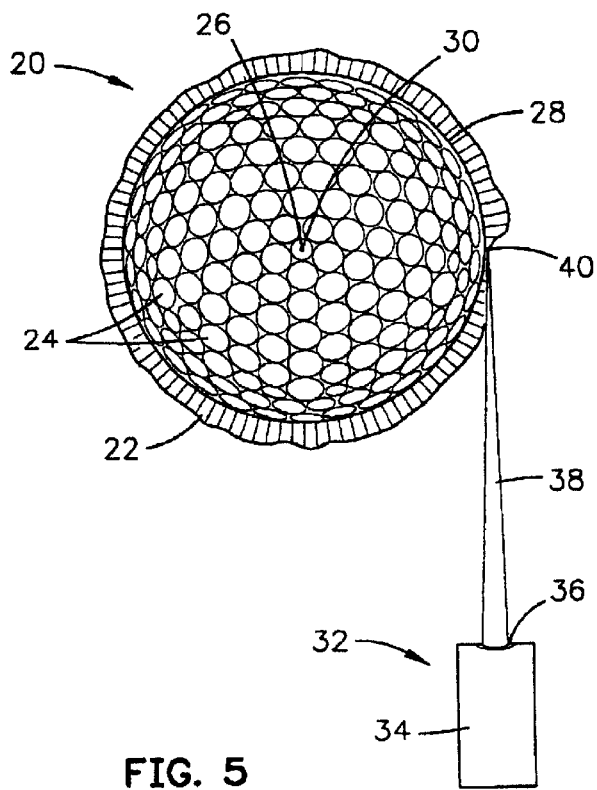
FIG. 5 is a schematic top view of an alternative embodiment of the present invention with the laser directed at the edge of the golf ball.
Figure 6:
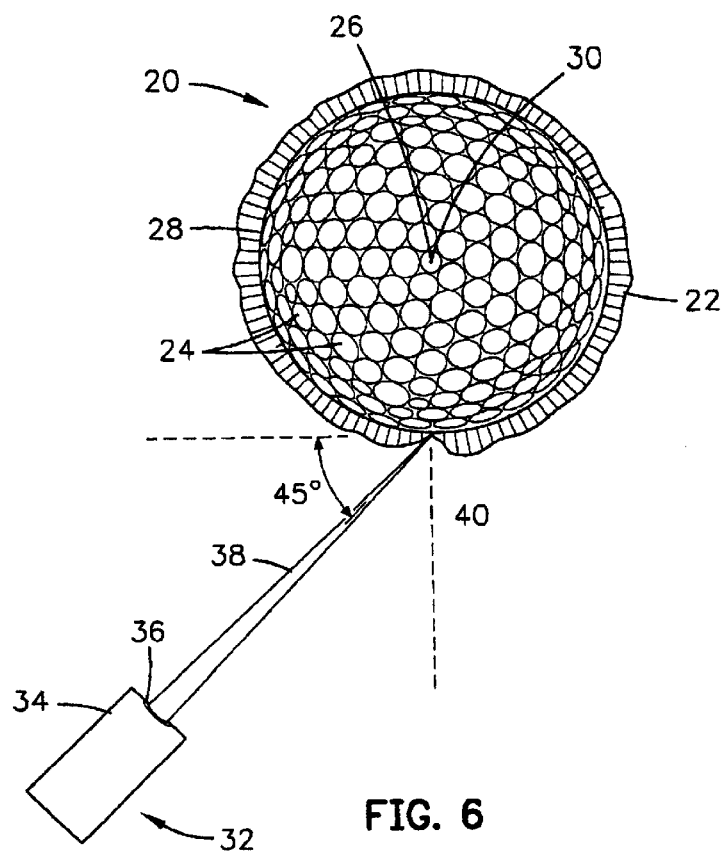
FIG. 6 is a schematic top view of an alternative embodiment of the present invention with the laser directed at a forty-five degree angle to the edge of the golf ball.
Figure 7:
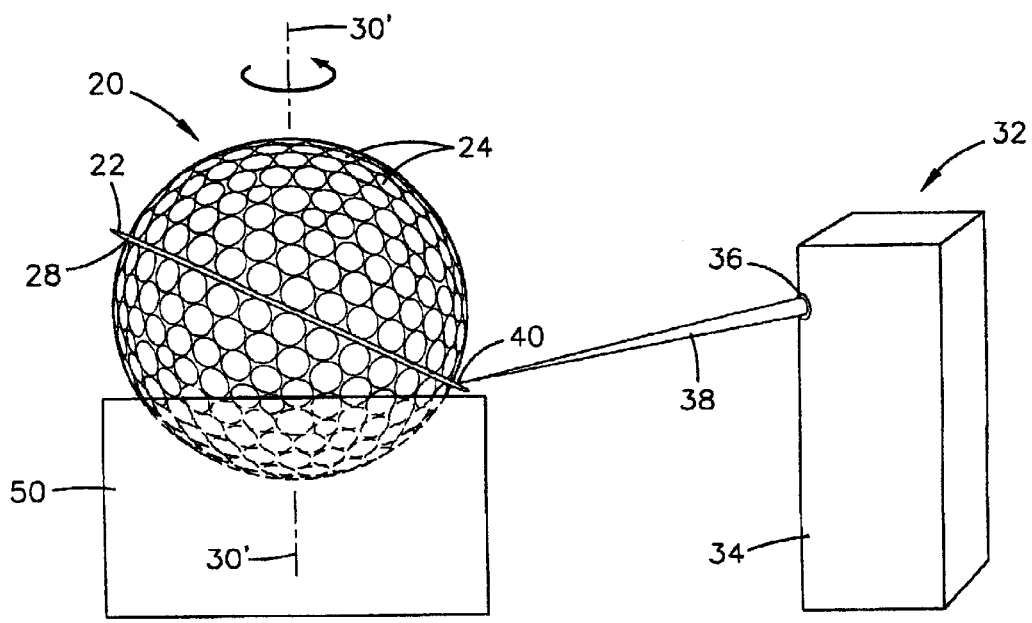
FIG. 7 is a schematic side view of an alternative embodiment of the present invention with the golf ball tilted at an angle to the laser.

FIGS. 5–7 illustrate yet further embodiments of the placement of the laser mechanism 32 relative to the golf ball 20. In FIG. 5, the laser mechanism 32 is positioned at the edge of the golf ball 20 to burn away the material as the golf ball is rotated on the holder 50. In FIG. 6, the laser mechanism 32 is positioned forty-five degrees to the edge of the golf ball 20 to remove the excess material 22. In FIG. 7, the golf ball 20 is tilted within the holder 50 relative to the laser beam 38 to remove the excess material 22. Those skilled in the pertinent art will recognize that a de-focused beam 38a may be used with the embodiments illustrated in FIGS. 3–7 without departing from the scope and spirit of the present invention.

Figure 8:
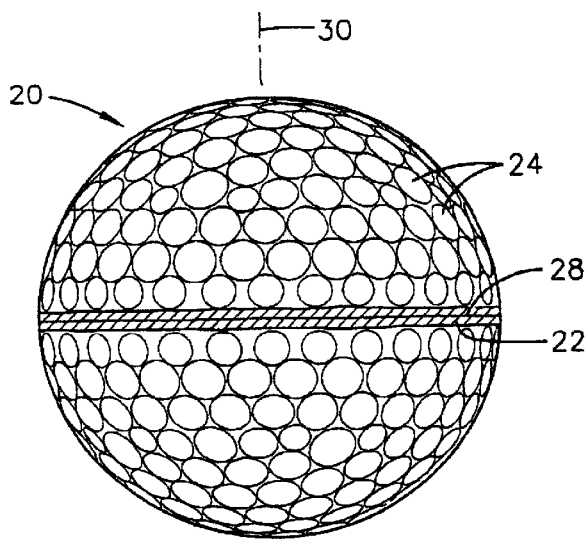
FIG. 8 is a side view of a golf ball prior to laser formation of dimples on the parting line of the golf ball.
Figure 9:
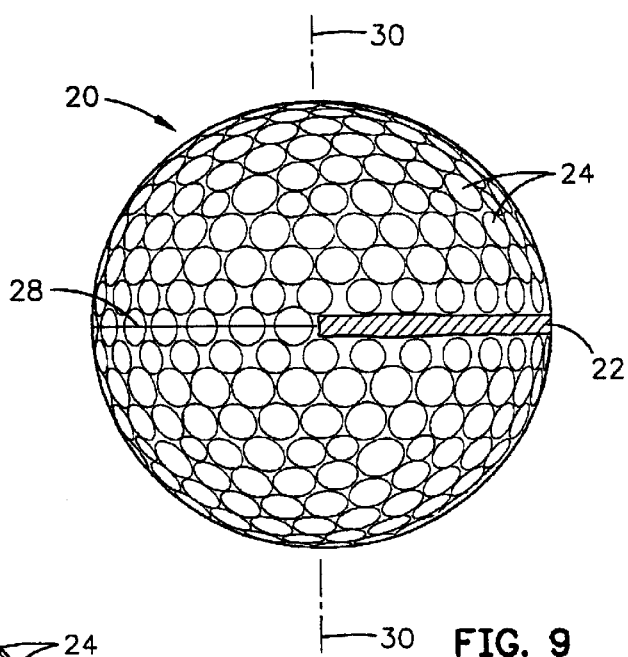
FIG. 9 is a side view of the golf ball of FIG. 8 during laser formation of dimples on the parting line of the golf ball.
Figure 10:
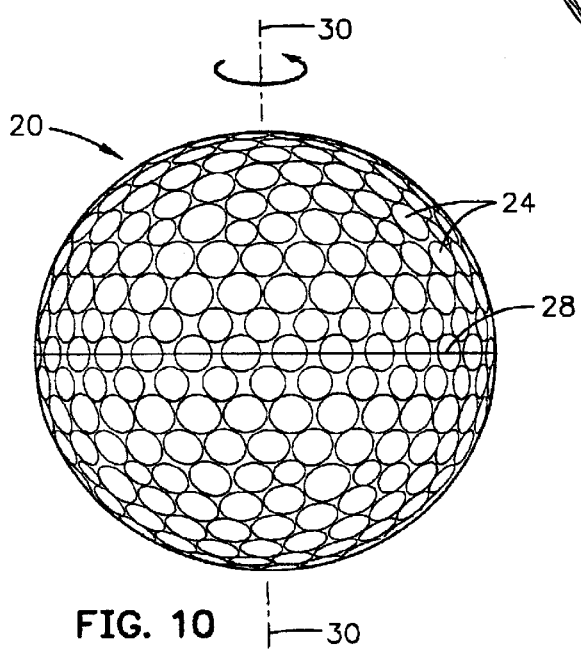
FIG. 10 is a side view of the golf ball of FIG. 8 after laser formation of dimples on the parting line of the golf ball.
Figure 11:
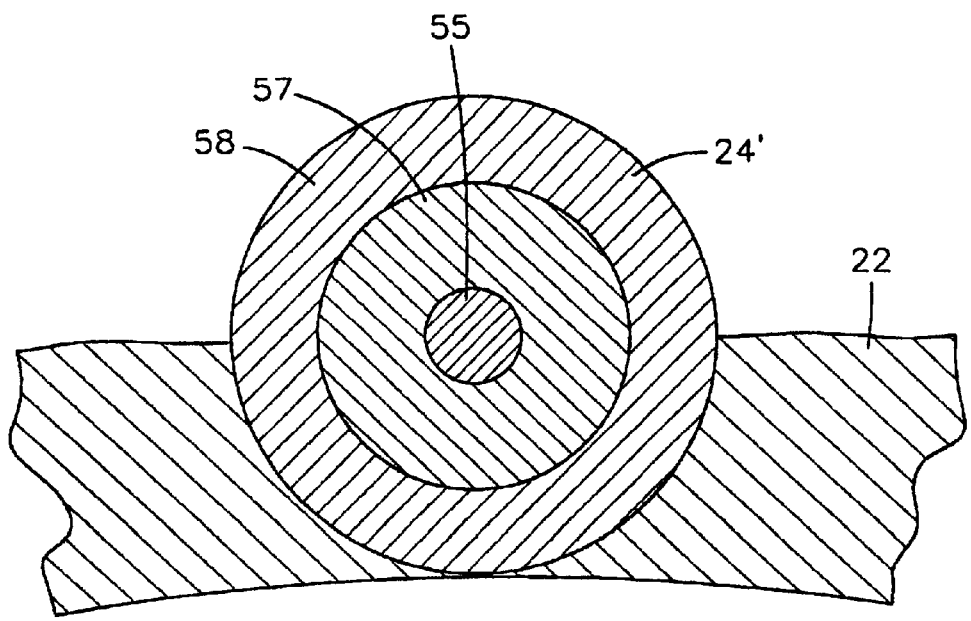
FIG. 11 is an enlarged view of the de-focused laser removing flash ring material from the golf ball to form a dimple.
Figure 11A:
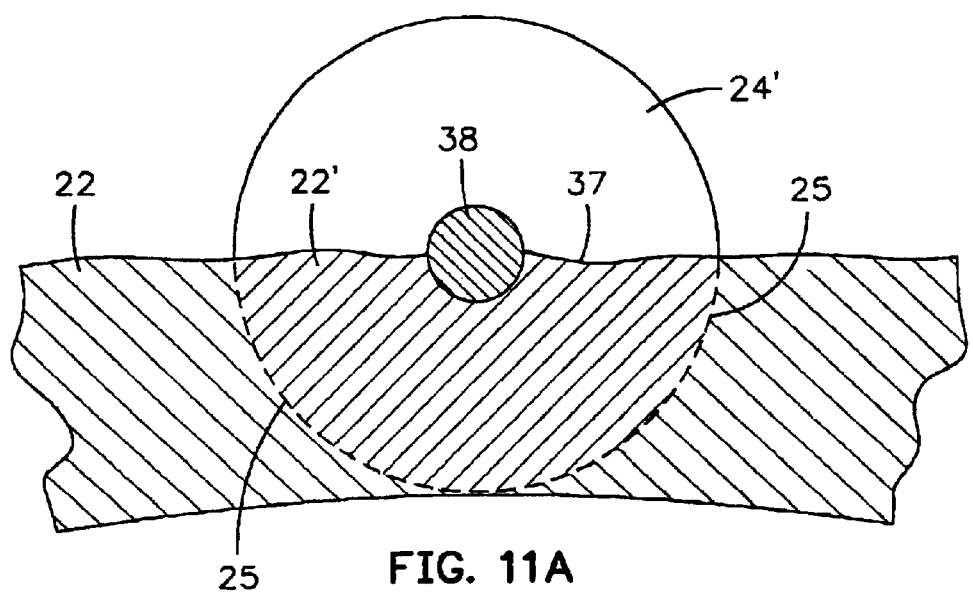
FIG. 11A is an enlarged view of the focused laser removing flash ring material from the golf ball to form a dimple.

In yet another embodiment shown in FIGS. 8–11, the present invention is utilized for laser formation of dimples 24 on the equator 28 or parting line of the golf ball 20. In FIG. 8, the golf ball 20 has a flash ring on its parting line. As the golf ball 20 is rotated, the de-focused laser beam 38a forms a dimple 24 on the surface of the golf ball 20. As shown in FIG. 11, the center 57 has the highest energy with outward concentric regions 57 and 58 having lower energy levels allowing for the greatest depth of the dimple 24 to be formed in the center with lower depths toward the surface as with mold-formed dimples. Alternatively as shown in FIG. 11A, the power of the focused laser beam 38 is adjusted to repeat a desired contour pattern of a dimple 24. Using either method, the laser beam 38 or 38a directs anywhere from 100 to 2000 pulses per dimple 24 to form the dimple 24 with the predetermined diameter, contour, depth, edge radius, and the like. Thus, the present invention allows for the post-molding formation of dimples 24 on the parting line of a golf ball 20.

Figure 12:
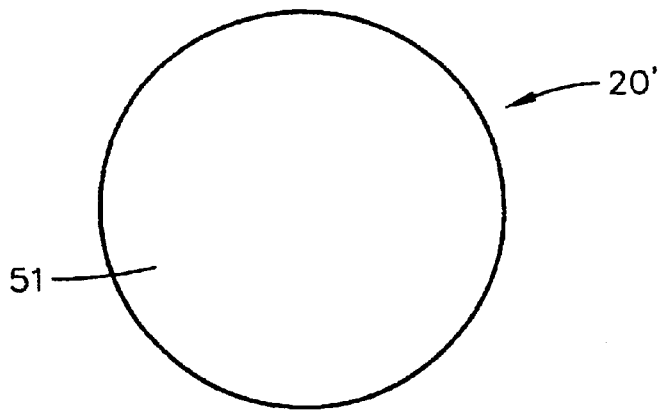
FIG. 12 is a top view of a smooth surface golf ball prior to laser formation of a dimple pattern thereon.
Figure 13:
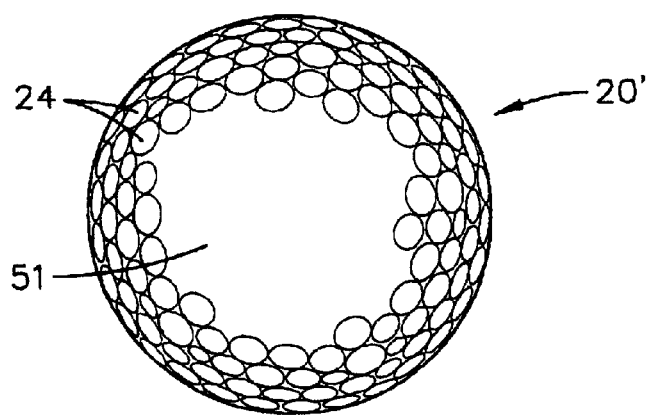
FIG. 13 is a top view of the golf ball of FIG. 12 during laser formation of a dimple pattern thereon.
Figure 14:
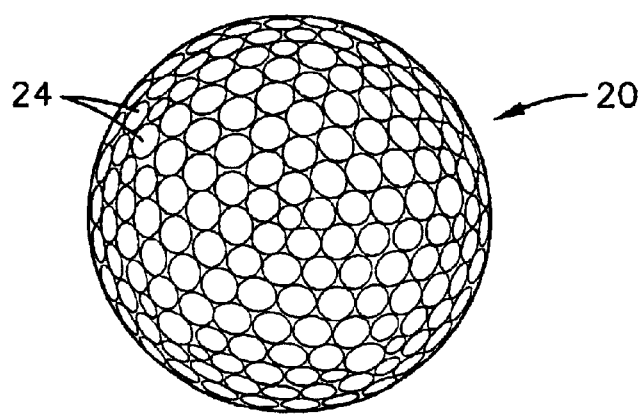
FIG. 14 is a top view of the golf ball of FIG. 12 after laser formation of a dimple pattern thereon.

FIGS. 12–14 illustrate yet another embodiment of the present invention. In FIG. 12, a golf ball 20' with a smooth surface 51 is provided. The surface material may be composed of a polyurethane, ionomer, or similar polymer surface. In FIG. 13, the golf ball 20' has undergone partial laser formation of an aerodynamic pattern thereon. In this example, dimples 24 have been laser formed on part of the smooth surface 51, however, those skilled in the relevant art will recognize that other aerodynamic patterns may be laser formed on the golf ball. Finally, FIG. 14 illustrates a completed aerodynamic pattern that is laser formed on the golf ball 20.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for removing excess material from a golf ball, the method comprising:

rotating a golf ball having excess material extending from a surface of the golf ball, the golf ball rotated about an imaginary axis through each of the poles of the golf ball;

directing a laser beam at the excess material, the laser beam directed substantially perpendicular to the imaginary axis; and burning the excess material from the golf ball through heat from the laser beam while the golf ball is rotated about the imaginary axis.

2. The method according to claim 1 wherein the rotation of the golf ball is at least 5000 rotations per minute.

3. The method according to claim 1 wherein the laser beam has a frequency of at least 500 hertz.

4. The method according to claim 1 wherein the outer surface of the golf ball is composed of a polyurethane material.

5. The method according to claim 1 wherein the outer surface of the golf ball is composed of an ionomer material.

6. The method according to claim 1 further comprising adjusting the length of the laser beam to follow the contour of the surface of the golf ball, including the surface of each of a plurality of dimples covered by the excess material.

7. The method according to claim 1 further comprising burning a plurality of dimples onto a parting line of the golf ball.

8. The method according to claim 1 wherein the laser beam is a de-focused laser beam.

9. The method according to claim 1 wherein the excess material is non-planar and the laser beam is adjusted in a vertical plane to burn away the excess material as the golf ball is rotated about the imaginary axis.

10. An apparatus for removing excess material from a golf ball, the apparatus comprising:

means for rotating a golf ball about an imaginary axis through each of the poles of the golf ball at a rotation of at least 5000 rotations per minute; and a laser mechanism disposed in proximity to the rotating means, the laser mechanism having a laser with a frequency of at least 500 hertz, and a nozzle for directing the laser at a golf ball disposed on the rotating means.

11. The apparatus according to claim 10 wherein the laser mechanism further comprises a source of gas, the gas having a pressure of at least 10 pounds per square inch.

12. The apparatus according to claim 10 wherein the frequency of the laser is between 500 hertz to 1100 hertz.

13. The apparatus according to claim 10 wherein the laser is de-focused to direct a laser beam that is substantially perpendicular to the imaginary axis.

14. The apparatus according to claim 10 wherein the laser is focused to direct a laser beam that is approximately forty-five degrees to normal of the imaginary axis.

15. The apparatus according to claim 10 wherein the laser mechanism delivers at least 700 pulses per dimple on the golf ball.

16. The apparatus according to claim 10 wherein the laser has a pulse width of at least 50 microseconds.

17. A method for imparting a dimple pattern on a smooth surface of a golf ball, the method comprising:
    rotating the golf ball about an imaginary axis of the golf ball;
    directing a laser beam at the smooth surface, the laser beam having a frequency of at least 500 hertz and a pulse width of at least fifty microseconds; and
    burning a dimple pattern on the smooth surface of the golf ball through heat from the laser beam while the golf ball is rotated about the imaginary axis.

18. The method according to claim 17 wherein the laser is a carbon dioxide laser.

19. The method according to claim 17 wherein the smooth surface is the parting line and a plurality of dimples are burned into the parting line of the golf ball.

20. The method according to claim further comprising adjusting the power of the laser beam for land areas and for dimples.

* * * * *